2,372,667

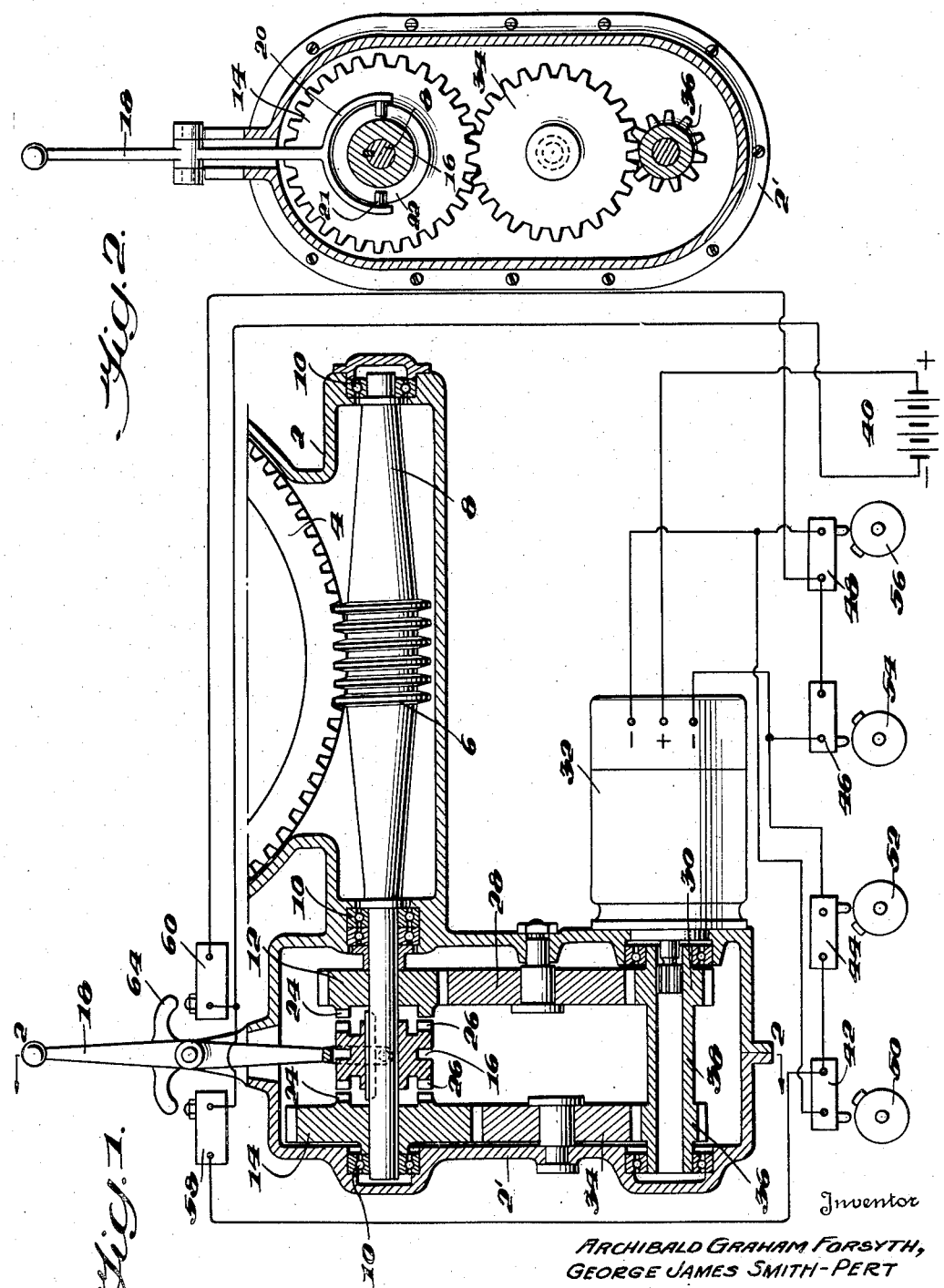
Inventor
ARCHIBALD GRAHAM FORSYTH,
GEORGE JAMES SMITH-PERT
By Robert B. Pearson
Attorney April 3, 1945. A. G. FORSYTH ET AL 2,372,667
VARIABLE SPEED MEANS FOR VARIABLE PITCH PROPELLER SYSTEMS
Filed April 2, 1943 3 Sheets-Sheet 2
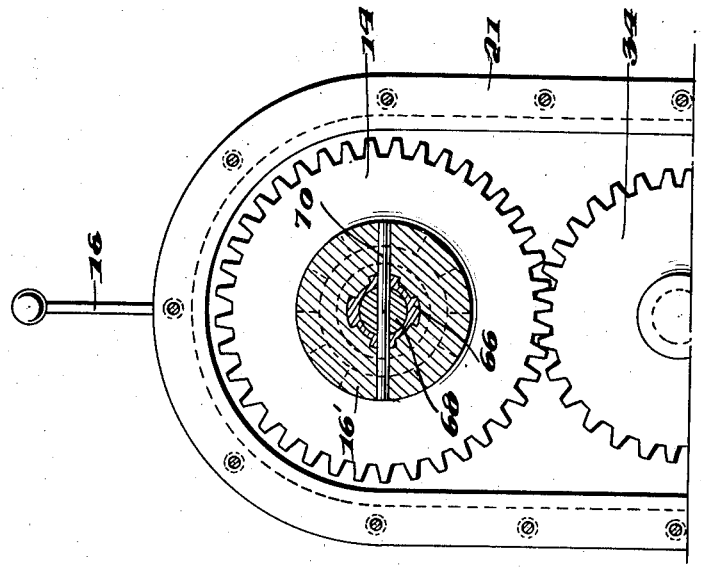
Inventor
ARCHIBALD GRAHAM FORSYTH,
GEORGE JAMES SMITH-PERT
By Robert B Pearson
Attorney Inventor
ARCHIBALD GRAHAM FORSYTH,
GEORGE JAMES SMITH-PERT Patented Apr. 3, 1945

UNITED STATES PATENT OFFICE 2,372,667

VARIABLE SPEED MEANS FOR VARIABLE PITCH PROPELLER SYSTEMS

Archibald Graham Forsyth and George James Smith-Pert, Cheam, England, assignors to The Fairey Aviation Company Limited, Hayes, Middlesex, England Application April 2, 1943, Serial No. 481,624

2 Claims. (Cl. 170—163)

This invention relates to improvements in variable pitch propeller systems for aircraft and more particularly the invention relates to means for effecting pitch changing movements in each direction at different speeds.

The invention, while adaptable for use with various types of variable pitch propeller systems is especially suited to the type of systems illustrated and disclosed in a copending application of Archibald G. Forsyth, S. N. 449,123, filed June 30, 1942. That application discloses a system in which the pitch changing movement is effected electrically by means of a motor, the circuit in which said motor is connected including cam means for shutting off the motor when the desired pitch position has been effected. However, the speed of pitch change in both directions is the same.

It has been found highly desirable to provide means whereby the pitch change from feathering position through coarse and fine pitch positions to reverse pitch position also in the opposite direction may be effected at differing rates of speed as required by flight conditions. A partial step in the direction of accomplishing this desideratum is disclosed in the Archibald G. Forsyth application, S. N. 465,618, filed November 14, 1942, which discloses booster means which may be employed to speed up the pitch change in both directions over a limited range when flight conditions require. Thus, in accordance with that invention it is possible when required to speed up the pitch changing movement from fine pitch to reverse pitch or from reverse pitch to fine.

The present invention renders it possible to effect such results through all pitch positions and by means of simplified mechanism, compactly arranged to meet the rigid space requirements of variable pitch propeller systems, particularly those of the self-contained type. The principal object of the invention is to provide such an arrangement.

Another object of the invention is to accomplish such differing speed pitch changing movements through the same electric motor employed for the pitch changing movement without the necessity of employing auxiliary power means.

These and further objects of the invention will become more apparent from the following description and claims when read in conjunction with the accompanying drawings in which:

Fig. 1 is a view of one form of the invention, partially in section, the electric circuit being shown diagrammatically.

Fig. 2 is a section taken on the line 2—2 of Fig. 1.

Fig. 3 is a partial section showing a different arrangement.

Fig. 4 is a section taken on the line 4—4 of Fig. 3.

Figure 5:
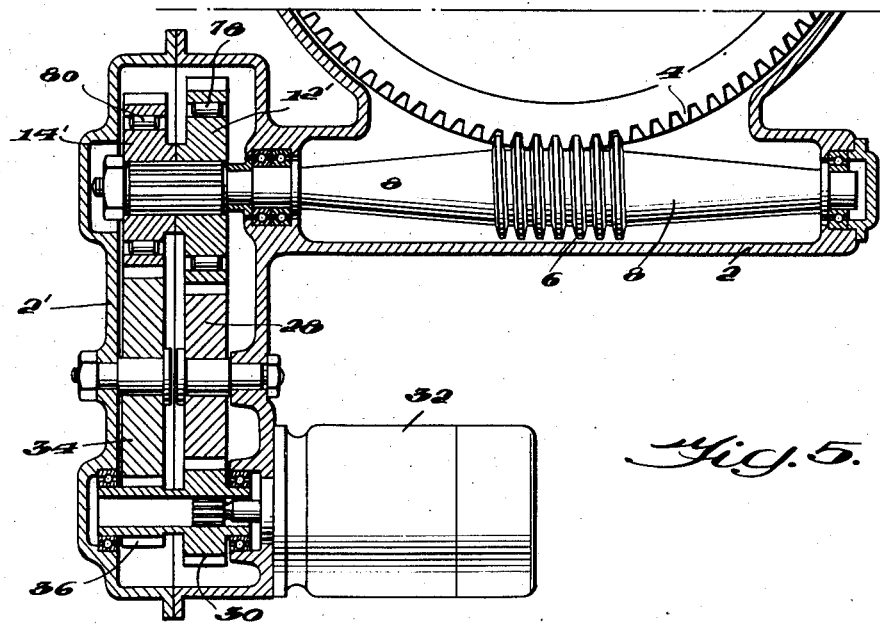
Fig. 5 is a sectional view of a modified form of the invention.

In the modification illustrated in Figs. 1 and 2, the reference numeral 2 indicates the housing of a pitch control arrangement. For purposes of the present invention it suffices to point out that this housing contains pitching mechanism including a gear, such as the ring gear 4, suitably geared or otherwise operably connected to rotate the propeller blades (not shown) about their longitudinal axes to vary their pitch.

The ring gear 4 is adapted to be rotated in one direction or the other by a worm 6 mounted on the shaft 8 mounted in bearings 10 carried by the housing 2.

The shaft 10 has two spaced gear wheels 12 and 14 normally freely rotatable thereon.

To accommodate the mechanism of the present invention, the housing 2 is provided with a supplemental housing 2'. The shaft extends into this supplemental housing 2' and the gear wheels 12 and 14 are also mounted therein.

Between the gear wheels 12 and 14 and keyed on shaft 8 is a sleeve 16. This sleeve rotates with the shaft but is mounted for axial sliding movement on the shaft, which movement is effected by the pivoted lever 18. The lower end of the lever 18 is bifurcated as shown in Fig. 2 and the arms 20 of the bifurcation are provided with inwardly projecting lugs 21 disposed in the annular groove 22 in the sleeve 16 so that movement of the lever in one direction or the other will slide the sleeve toward gear wheels 12 or 14, respectively.

Gear wheels 12 and 14 have dogs 24 on their facing sides which dogs are adapted to be engaged respectively by dogs 26 carried by and rigid with the sleeve 16.

Gear wheel 12 is engaged by a gear 28 mounted for rotation within the supplemental housing 2'. Gear 28 is in turn engaged by a pinion 30 mounted within housing 2' and driven by a reversible electric motor 32 carried by housing 2'.

Gear wheel 14 is engaged by a gear 34, in turn engaged by a pinion 36 also driven by the electric motor. Advantageously, the pinions 30 and 36 may be integrally formed on a sleeve 38 suitably splined to the drive shaft of motor 32.

In Fig. 1 the lever 18 is shown in neutral position and operation of the electric motor 32 would not, therefore, transmit movement to the shaft 8 since gears 12 and 14 are freely rotatable on said shaft. However, if lever 18 is moved to the left in Fig. 1, the dogs 26 on the sleeve 16 will engage the dogs 24 on the gear 12, and operation of motor 32 will then, through gears 30, 28 and 12, transmit rotary movement to the shaft 8, thus rotating worm 6 and actuating the pitch changing gear 4 in either direction depending on the direction of rotation of the motor.

Conversely, when lever 18 is moved to the right, the dogs 26 on sleeve 16 will engage the dogs 24 on gear 14 and operation of motor 32 in one direction or the other will, through gearing 36, 34 and 14, rotate shaft 8 and worm 6, thus effecting a pitch changing movement. Since, however, the gears in this gearing differ in size and arrangement from gearing 30, 28 and 12, it is obvious that the pitch changing movement in either direction effected therethrough will be at a lesser rate of speed.

As previously explained this is of considerable advantage because flight conditions frequently demand rapid changes from one pitch position to another.

In Fig. 1 an electric control circuit is diagrammatically shown. The motor 32 is connected in this circuit to be energized by the battery 40 when the circuit is closed. Also in the circuit, are the reverse, feathering, fine and coarse pitch limit switches 42, 44, 46 and 48 each adapted to be broken by the cams 50, 52, 54 and 56 respectively. These cams are driven by the motor 32 by any suitable means (not shown) and are for tripping the switches 42, 44, 46 and 48 when predetermined limits of reverse pitch, feathering pitch, fine and coarse pitch positions have been attained through operation of motor 32.

The control circuit also includes two switches 58 and 60 adapted respectively to be actuated by the arms 62, 64 carried by the upper portions of lever 18. Actuation of lever 18 in one direction or the other will consequently close the circuit to start the motor while simultaneously operatively connecting the shaft 8 to one set of gearing or the other.

When the lever 18 is moved to the right or to "low" gear position, switch 60 will be made or closed thus directing current to motor 32. Switches 46 and 48 are normally made and pitch changing movement through "low" gearing 36, 34, and 14 will continue until either the fine position cam 54 or the coarse position cam 56 breaks its respective switch and shuts off the motor. The cams 54 and 56 are so designed that the pitch changing movement toward fine and coarse pitch will be stopped when predetermined fine pitch and coarse pitch limits have been reached.

The actuation of the motor 32 in one direction or the other between fine and coarse pitch positions may be controlled by governor means (not shown) but similar to those illustrated and described in the Archibald G. Forsyth application S. N. 449,123 to which reference has already been made.

When lever 18 is moved to the left to "high" gear position, the arm 62 on lever 18 closes switch 58 in the circuit line including reverse and feathering pitch limit switches 42 and 44 which are normally closed. Depending on the direction of the motor 32, pitch changing movement toward reverse or feathering pitch positions will continue until either the reverse pitch cam 50 or the feathering pitch cam 52 will break its respective switch 42 or 44 and thus shut off the motor.

The arrangement illustrated in Figs. 3 and 4 is generally similar to that just described with one exception. This exception relates to the manner of actuating the sleeve 16. In this instance, the end of shaft 8 is formed as a hollow cylinder 66 in which a piston 68 is disposed. The piston carries a transverse rod 70 which passes through slots 72 in the wall of the cylinder and through the sleeve 16 splined to the cylinder. The piston 68 is adapted to be moved axially in the cylinder 66 by means of a rod 74, the outer end of which is operatively connected to the lower end of lever 18. The end of rod 74 has two lateral rings 75, and the lower end of lever 18 is bifurcated. The bifurcated portions 76 are disposed between the rings 75. Actuation of the lever in one direction or the other will consequently move the piston 68 and also the sleeve 16 causing the dogs thereon to engage the dogs on the gear wheels 12 and 14, respectively. Rotation of either of said gear wheels may thus be transmitted to the shaft 8.

The embodiment of the invention illustrated in Fig. 5 operates on a slightly different principle. In this modification the end of shaft 8 carries two free wheels 12' and 14', the inner portions of which are splined to the shaft 8 while the outer peripheral portions are adapted, through free wheel arrangements 78 and 80, so that these outer portions may rotate freely in one direction on their inner portions. Rotation of the outer portions in the other direction, however, causes the outer portions to be temporarily locked to the inner portions. The free wheel arrangements of wheels 12' and 14' are designed to lock in opposite directions. Such free wheels are well known per se and any such arrangements may be employed.

The device operates as follows: Rotation of the motor 32 in one direction will, through gearing 30 and 28, rotate the outer portion of gear wheel 12', thus causing it to lock to the inner portion thereof through the free wheeling arrangement 78. The shaft 8 is thus rotated. No motion is transmitted to shaft 8 through gearing 36, 34 and 14' because the free wheeling arrangement 80 is such as to permit the outer portion of wheel 14' to rotate freely on its inner portion when the motor is running in this direction.

Conversely, when the motor 32 is rotating in the other direction, actuation of gears 36 and 34 will, through the free wheeling arrangement 80, lock the outer and inner portions of wheel 14', thus transmitting movement to shaft 8. During this time the outer portion of gear wheel 12' freely rotates on its inner portion as the free wheeling arrangement 78 is only adapted to lock when the outer portion of wheel 12' is rotating in the opposite direction.

It will thus be noted that pitch changing movement in one direction is carried out at a faster rate of speed than in the other. Thus a pitch change from feathering pitch position, through coarse and fine pitch, to reverse pitch may be effected with "high" gear (gearing 30, 28 and 12'), while a pitch change in the other direction from reverse pitch, through fine and coarse to feathering, may be effected through "low" gear (gearing 36, 34 and 14').

As in the first embodiment, and also as disclosed in the Archibald G. Forsyth application S. N. 449,123, referred to supra, limit switches controlled by cams driven by motor 32 may be used for shutting off the motor when a predetermined pitch position has been attained.

Figure 6:
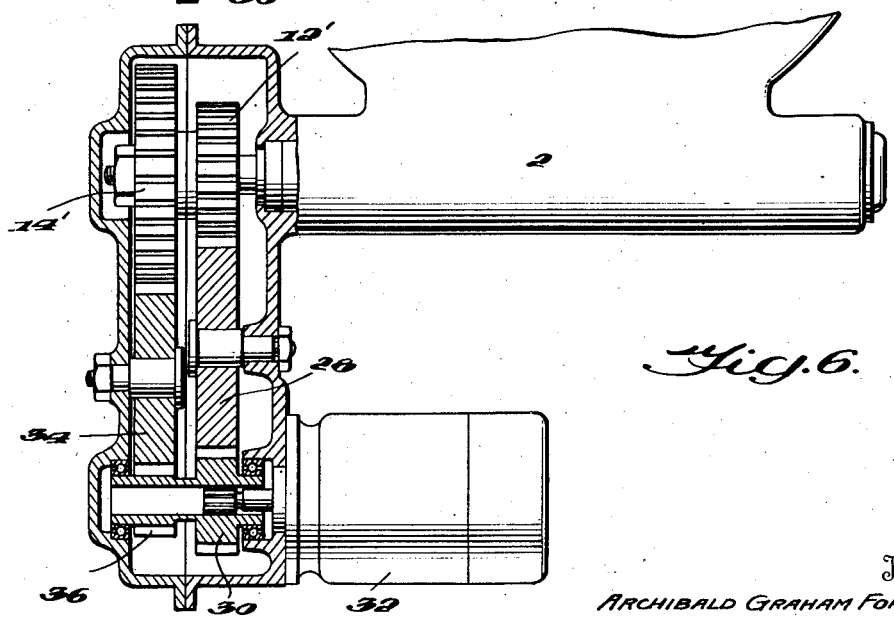
Fig. 6 is a similar view of a modified form.

Fig. 6 is similar to Fig. 5 but shows how a more pronounced speed ratio may be effected by staggering the axes of the gear wheels 34 and 28.

The invention can be employed with various types of variable pitch propeller systems including those having two or more sets of propellers driven from coaxial propeller drive shafts. Moreover, because of its simplicity and the little space it requires, it is admirably suited for pitch control systems of the self-contained type such as shown, for example, in the Archibald G. Forsyth application, S. N. 472,882, filed January 19, 1943.

Manifestly, changes in structure, design and operation may be made within limits without departing from the invention. The modification illustrated and described is exemplary only and the scope of the invention is only to be limited as defined in the claims which follow.

We claim:

1. In a propeller system for aircraft and the like and having at least one set of variable pitch propellers, means for driving the pitch changing mechanism of said propellers, said means comprising a reversible motor and gearing adapted to be driven by said motor to drive said pitch changing mechanism in one direction or the other, said gearing including two gear trains providing differing gear ratios, and each gear train including mechanism which transmits driving movement in one direction only, and each of said mechanisms being disposed to transmit movement only in a direction opposite to the other.

2. In a device as defined in claim 1, said motor being electric, a circuit for said motor, and means driven by said motor for breaking said circuit to shut off the motor when predetermined pitch positions have been reached.

ARCHIBALD GRAHAM FORSYTH.
GEORGE JAMES SMITH-PERT.